Sept. 13, 1938. J. J. PETERSON 2,130,099
GARBAGE TRUCK
Filed Aug. 2, 1937 5 Sheets-Sheet 1
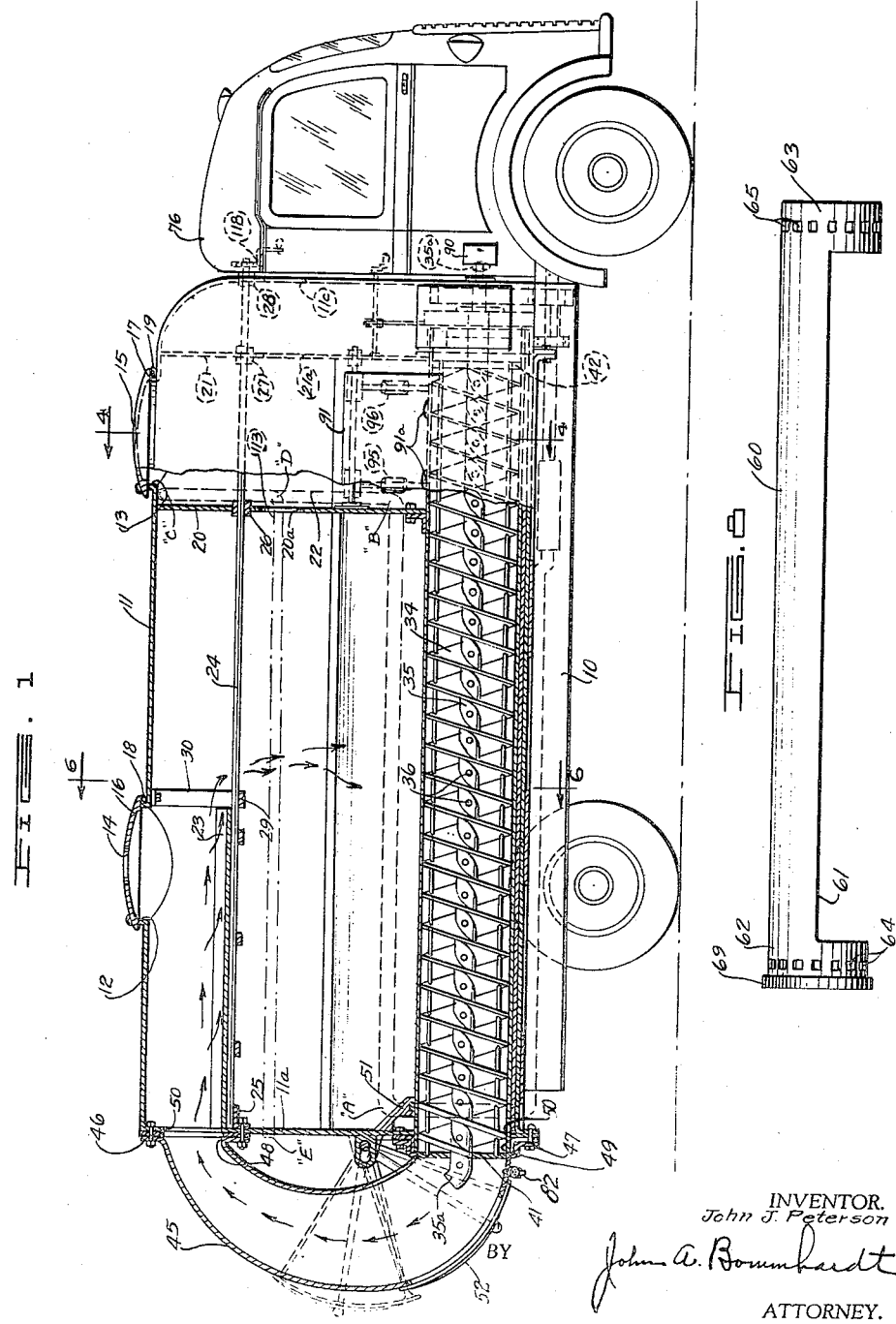
INVENTOR.
John J. Peterson
BY John A. Bomnhardt
ATTORNEY.

Sept. 13, 1938.　　　J. J. PETERSON　　　2,130,099
GARBAGE TRUCK
Filed Aug. 2, 1937　　　5 Sheets-Sheet 2
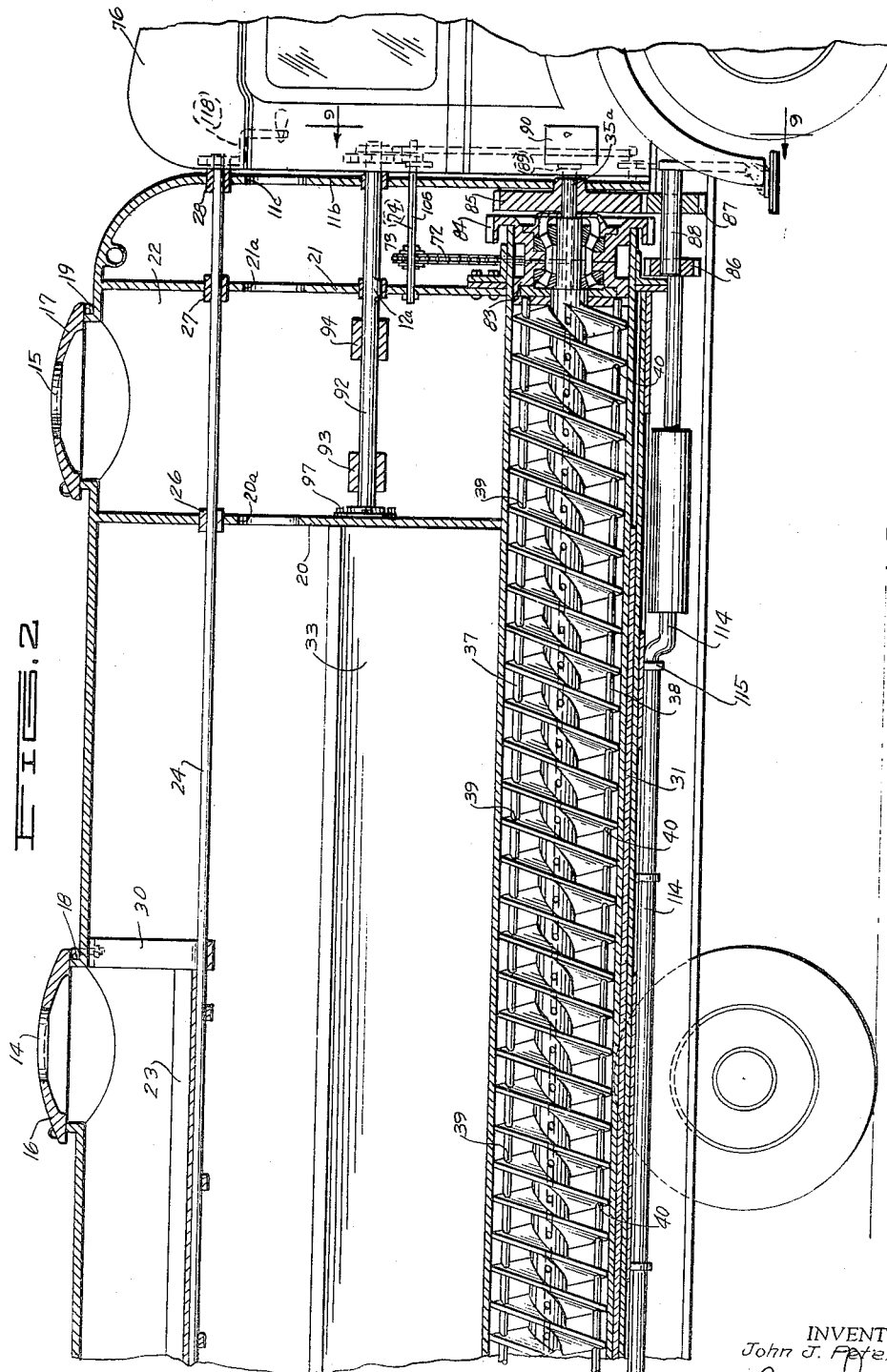
INVENTOR.
John J. Peterson
BY
ATTORNEY.

Sept. 13, 1938. J. J. PETERSON 2,130,099
GARBAGE TRUCK
Filed Aug. 2, 1937 5 Sheets-Sheet 3
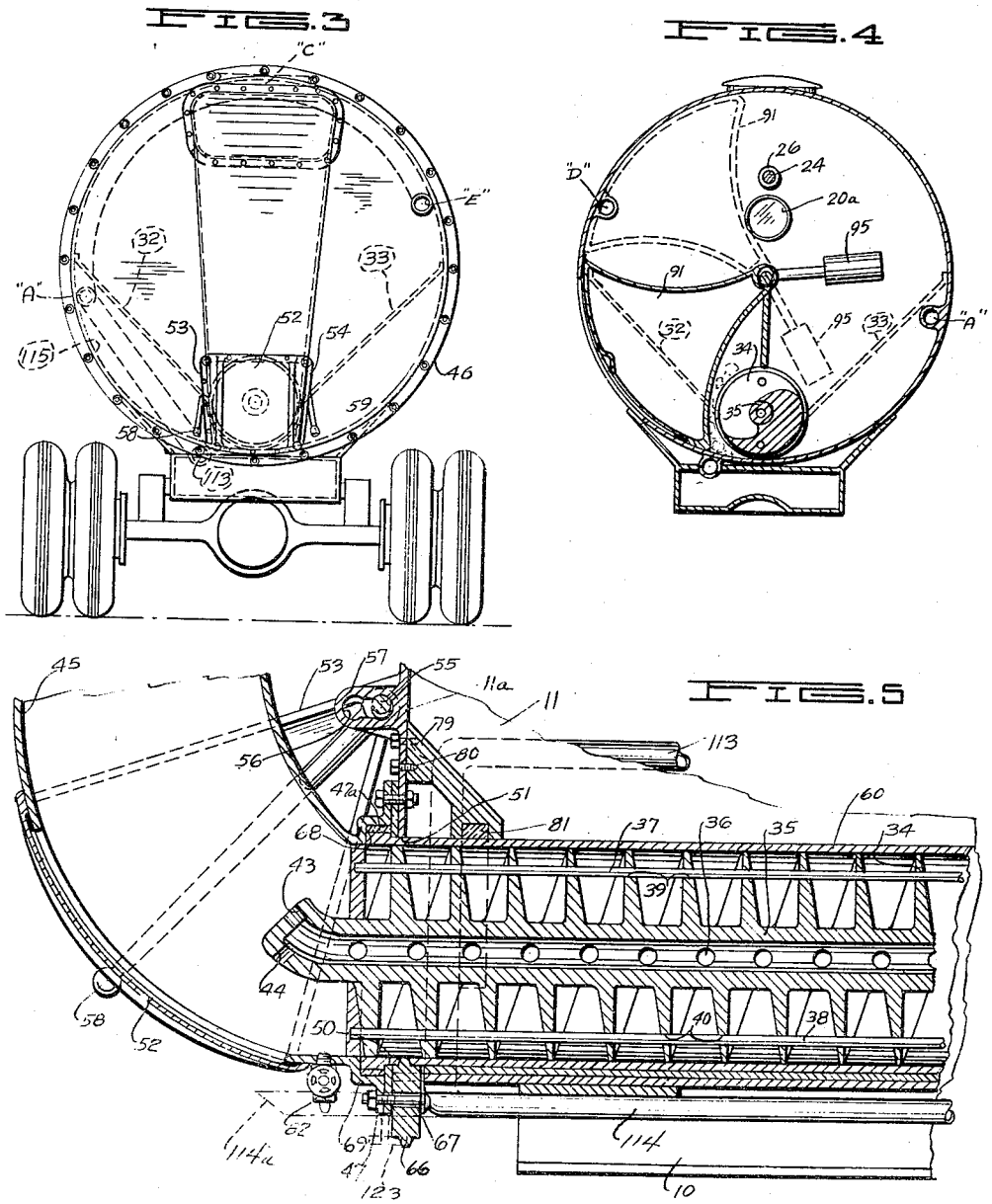
INVENTOR.
John J. Peterson
BY John A. Bomm~~~~
ATTORNEY.

Sept. 13, 1938.   J. J. PETERSON   2,130,099
GARBAGE TRUCK
Filed Aug. 2, 1937   5 Sheets-Sheet 4

INVENTOR.
John J. Peterson
BY
ATTORNEY.

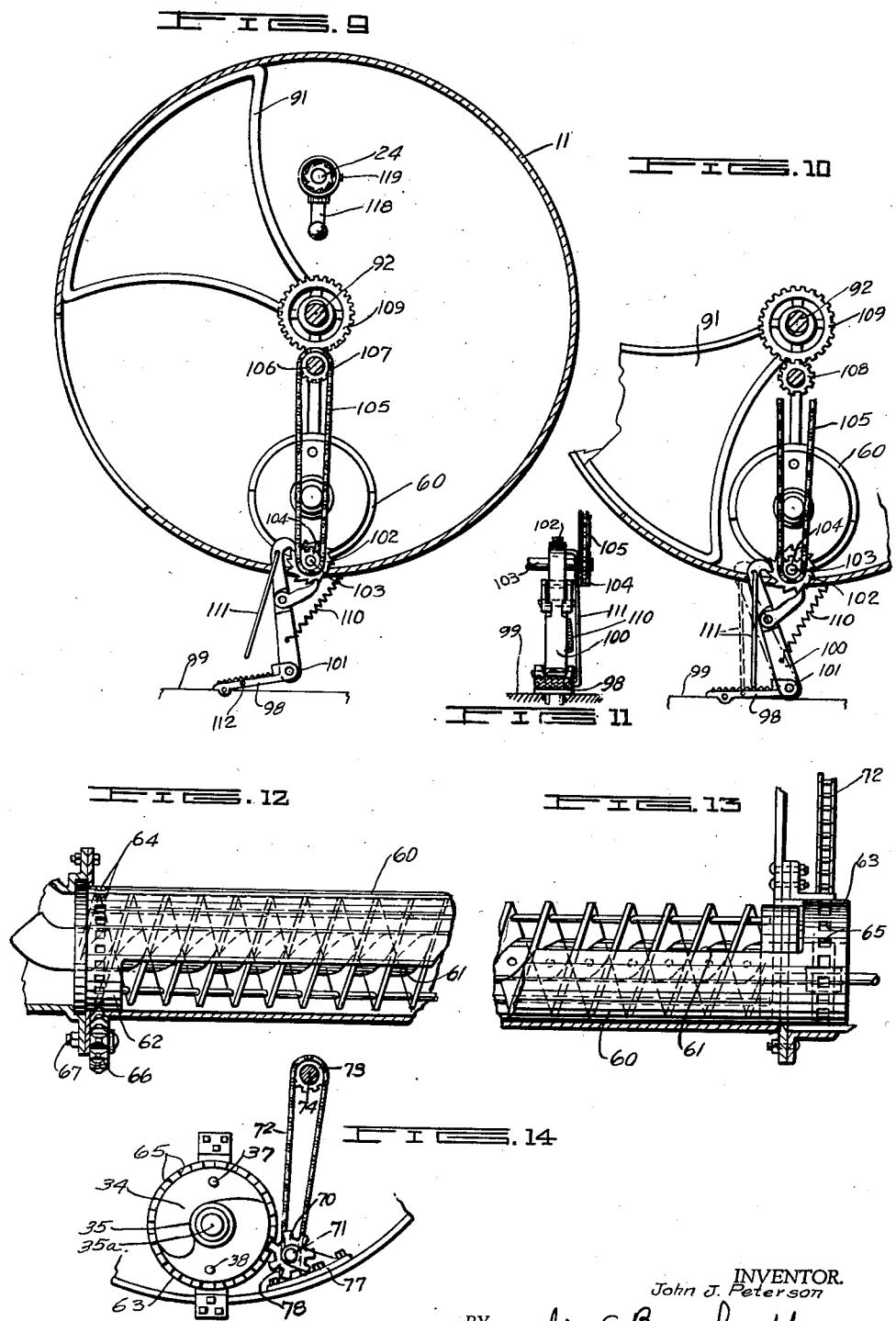

Patented Sept. 13, 1938

2,130,099

UNITED STATES PATENT OFFICE 2,130,099

GARBAGE TRUCK

John J. Peterson, Cleveland, Ohio

Application August 2, 1937, Serial No. 156,892

6 Claims. (Cl. 214—67)

This invention relates to improvements in closed trucks of the type especially adapted for collecting and transporting garbage, and is related to the invention shown in my allowed application Serial No. 507,539 filed Dec. 26, 1930, now forfeited.

An object is to provide a means whereby the odors may be confined and the contents be removed at will in a minimum of time.

A further object is to provide a means whereby the loading and unloading may be operated and controlled from the power plant of the truck.

Other objects are the provision of means whereby the interior of the truck may be heated to further facilitate the removal of its contents and to provide a system by which the interior may be flushed out and thoroughly cleansed.

These and other objects may be noted from the following specification and its accompanying illustrations, in which;

Fig. 1 is a side elevation, partly in section, of the garbage truck.

Fig. 2 is an enlarged partial side elevation and section of the forward end of the truck adjacent the cab.

Fig. 3 is a rear elevation of Fig. 1.

Fig. 4 is a section taken on line 4—4 of Fig. 1.

Fig. 5 is an enlarged fragmentary rear end portion of the chute and double worm.

Fig. 8 is a side elevation of the rotating worm cover.

Fig. 9 is a section on line 9—9 of Fig. 2, with wall 21 cut away, illustrating the method of operating the distributing trough and the loading door.

Fig. 10 illustrates the action of the operating jaw and foot pedal in opening and closing the loading door.

Fig. 11 is a front view of the foot pedal, operating jaw and ratchet shown in Figs. 9 and 10.

Fig. 12 is a fragmentary side elevation of the rear end of the worm cover in closed position.

Fig. 13 is a similar view of the front end in open position.

Fig. 14 is an end view of Fig. 12 showing the method of operating the worm cover.

Figure 6:
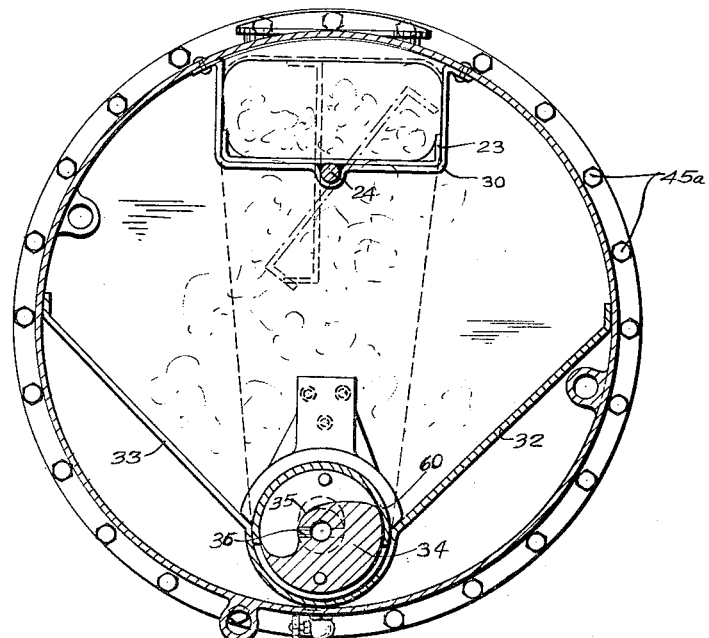
Fig. 6 is a section taken on line 6—6 of Fig. 1 illustrating the pivoting of the distributing trough.

Again referring to the illustrations, the frame 10 has mounted thereon a body 11, preferably cylindrical as shown by Figs. 3, 4, 6 and 7 specifically. The top surface of the body 11 has a pair of ports 12 and 13 therein with glass discs 14 and 15 mounted in the top surface of the covers 16 and 17 of said ports respectively; the covers 16 and 17 being hinged at 18 and 19 to the port walls for easy access within the truck body 11.

Within the body 11 are a pair of inner walls 20 and 21 which are adjacent each side of the port 13 and form a compartment 22 wherein is mounted the mechanism for operating the various movable parts and which will hereinafter be referred to.

A distributing trough 23 is secured to a rotating shaft 24 mounted in bearings 25, 26, 27 and 28 secured to and through the rear wall 11a, inner walls 20 and 21 and front wall 11b respectively and also within the bearing 29 of the strap 30 secured to the top inner wall of the cylindrical body 11.

The inner walls 20 and 21 each have an opening 20a and 21a respectively directly below and adjacent the rotating shaft 24, the front wall 11b also having an opening 11c which registers with the openings 20a and 21a of the inner walls 20 and 21.

Mounted within the body 11, and resting upon its inner bottom surface, is a circular channel 31 having angularly disposed walls 32 and 33, said sides resting against the inner walls of the cylindrical body 11 between the rear end wall 11a and the inner wall 20.

Within the circular channel 31 is mounted a double spiral conveyor or worm 34 having a hollow shaft 35 through the center thereof, said shaft having a plurality of perforations 36 therethrough. Rods 37 and 38 are mounted through apertures 39 and 40 in the top and bottom fins respectively of the spiral conveyor 34 adjacent the apex of the fins, each aperture 39 and 40 registering with the others of like characters of reference. The last two fins 34a of the conveyor 34 are heavier than the others of the fins.

The opposed ends of rods 37 and 38 are fitted within collars 41 and 42 mounted rigidly on the opposed ends of the hollow shaft 35 of the spiral conveyor 34, said rods having no purpose other than to strengthen the spiral conveyor 34 and prevent buckling under pressure.

The extreme rear end 35a of the hollow shaft 35 is curved slightly and has angularly disposed perforations 43 and 44 therein as shown in Fig. 5.

A distributing chute 45 is flanged at 46 and 47 and secured to the rear end wall 11a of the body 11 by bolts 48 through said flanges, the openings 48 and 49 in the chute registering with the openings 50 and 51 in the rear wall 11a of the body 11.

A discharge door 52 is pivotally secured by its flanged sides 53 and 54 to a cam shaft 55 rotatably mounted through an elongated aperture 56 in a bracket 57 which is an integral part of the rear wall 11a, said cam shaft being operated by handles 58 and 59 projecting angularly therefrom and extending rearwardly on each side of the discharge door 52.

A conveyor cover 60 has an elongated cut-out center portion 61, and its opposed ends 62 and 63 have a series of apertures 64 and 65 respectively therethrough around the outer periphery thereof, the apertures 64 in the outer end 62 engaging a gear 66 rotatably mounted on a pin 67 secured through the flange 47 of the distributing chute 45. A bushing 68, mounted within the shouldered portion 47a of the flange 47, serves as a bearing wherein rotates a flanged portion 69 of the conveyor cover 60 adjacent the outer apertured end 62 thereof.

The opposite or front end 63 of the conveyor cover 60 engages a sprocket 70 mounted on a shaft 71 and driven by means of a chain 72 from a sprocket 73 which in turn is mounted on a shaft 74 which is operated by a lever 75 within the cab 76. The shaft 71 is secured in position by means of brackets 77 and 78 mounted on the wall of the cylindrical body 11.

A bearing bracket 79 mounted upon the inner surface of the rear wall 11a, and secured thereto by bolts 80, partially encircles the conveyor cover 60, a bushing bearing 81 being contained therein as shown specifically in Fig. 5.

A discharge valve 82 is secured through the lower wall of the cylindrical chute 45 adjacent the discharge door 52.

The front end of the hollow shaft 35 is mounted within a split bearing 83 in a gear 84, the power take off being through the transmission by means of the gears 84 and 85 on the shaft 35 and pinion gears 86 and 87 on shaft 88 and operated within the cab 76.

A cap 89 on the end of the shaft 35, may be removed when a small door 90, in the side of the cab 76, is opened and a hose may be attached thereto for forcing water through the hollow shaft 35.

Figure 7:
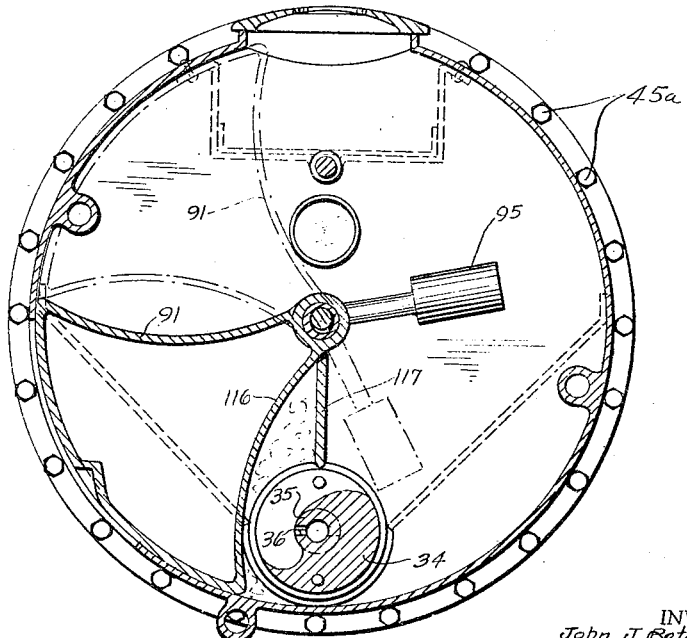
Fig. 7 is an enlarged view similar to Fig. 4.

A loading door 91 on the right side of the body 11 is mounted on a cam shaft 92 said shaft being mounted through collars 93 and 94 to which may be secured counter weights 95 and 96, as shown in Figs. 1, 4, and 7 the outer end of the shaft 92 being retained within a bearing 97 mounted within the chamber 22 on the inner wall 20. The lifting up of the door 91 by means of its hand holds 91a, causes the counter weights 95 and 96 to hold the door in an open position, until the action of pulling down on the hand holds, draw it closed again. A modified form illustrated in Figs. 2, 9, 10 and 11 shows the cam shaft operated by a foot lever 98 pivotally mounted on a step 99 beside the cab 76, said foot lever being attached to an operating jaw 100 by a pivot pin 101, said jaw in turn contacting a ratchet 102 on a shaft 103; a sprocket 104, mounted on the shaft 103 forward of the ratchet 102, operates a chain 105 which in turn motivates a shaft 106 by means of a sprocket 107; a pinion gear 108, mounted on a shaft 106 rearward and adjacent to the sprocket 107, meshes with a gear 109 on the shaft 92 causing the door 91 to be rotated upward as shown in Fig. 9; a tension spring 110 is secured to the operating jaw and the base of the cylindrical body 11 to prevent the jaw 100 from dropping away from the ratchet 102.

To release the loading door 91 to the closed position, a rod 111 attached pivotally to the operating jaw 100, is drawn down and thrust into the aperture 112 in the side of the foot lever 98; the lever is pressed down and the jaw 100 releases the ratchet 102; the weight of the door causes it to reverse the action of the sprockets, chains and gears and the door drops to its closed position as illustrated by Fig. 10.

A hot air system which heats the contents of the truck is obtained by attaching conduit 113 to the exhaust pipe 114, said conduit 113 being carried up from the rear of the truck and penetrating the body 11 to position "A" within the chamber 115, formed within the body 11 between the angularly disposed wall 32 of the circular channel 31 and the inner surface of the body 11 and is then carried forward again within this chamber to the inner wall 20, through this wall into chamber 22, through the inner wall 21, to position "B" and upward following the contour of the body 11 to position "C" and down on the opposite side of the body to position "D" then rearward again through the body to its exhaust outlet "E". Straps 115 under the body 11 hold the exhaust conduit 113 to the underside of the body below the conveyor 34. This system keeps the truck contents soft and pliable so that they may be readily discharged.

After the garbage is loaded through the loading door 91, the door is dropped to its closed position, the lower end thrusting the waste 116 into the spiral conveyor 34, a wall 117, within the chamber 22 above the said conveyor, preventing the said waste from entering the opposite side of the chamber.

The waste entering the conveyor 34 is carried back the length of the conveyor and thrust upward through the distributing chute 45, the conveyor cover 60 as shown in Fig. 12 confining the waste material 116 within the conveyor housing thus formed, the waste entering the main body 11, drops onto the distributing trough 23, the shaft 24 to which the trough is secured is rocked left or right by a ratchet handle 118, a reversing button 119 on the ratchet changing the direction of the ratchet movement.

When the middle part of the body 11 is filled as well as the chute 45, the discharge door 52 is opened, the conveyor cover 60 is reversed to the open position shown in Fig. 13 and the waste material 116 is forced out through the discharge door 52, the moisture and drippings being released through the valve 82.

Both loading and discharge doors 91 and 52 are mounted on eccentric or cam shafts in such manner as to form a tight seal when the doors are in a closed position with the rubber gaskets 120 and 121 between the doors 52 and 91 and the distributing chute 45 and the body 11 respectively.

When the material is all discharged a hose may be connected to the end 35a of the shaft 35 and water forced through the perforations 36 in said shaft, and through the angularly disposed perforations 43 and 44 in the end of the shaft 35 cleaning the conveyor and chute thoroughly, the trough and inside of the body may be cleaned through the port 12.

A valve 123 on the exhaust line 114, rearward of and adjacent to the upward turned conduit 113 shuts off the system at will, and causes the hot air from the exhaust to go straight through and out of the exhaust terminal 114a of the exhaust line 114.

I claim:

1. A garbage truck comprising a body having a load compartment therein, a screw conveyor